US010626900B2

(12) United States Patent
Stastny et al.

(10) Patent No.: US 10,626,900 B2
(45) Date of Patent: Apr. 21, 2020

(54) SPRING CONNECTION ELEMENT

(71) Applicant: BÖLLHOFF VERBINDUNGSTECHNIK GmbH, Bielefeld (DE)

(72) Inventors: Petr Stastny, Mlada Boleslav-Kosmonosy (CZ); Alexander Vorderwisch, Steinhagen (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 185 days.

(21) Appl. No.: 15/876,818

(22) Filed: Jan. 22, 2018

(65) Prior Publication Data

US 2018/0195540 A1     Jul. 12, 2018

Related U.S. Application Data

(62) Division of application No. 15/022,763, filed as application No. PCT/EP2014/069636 on Sep. 15, 2014, now Pat. No. 9,909,603.

(30) Foreign Application Priority Data

Sep. 20, 2013    (DE) .................. 10 2013 219 013

(51) Int. Cl.
*F16B 2/24*        (2006.01)
*F16B 37/12*       (2006.01)

(52) U.S. Cl.
CPC .............. *F16B 2/248* (2013.01); *F16B 37/12* (2013.01)

(58) Field of Classification Search
CPC .......... F16B 2/248; F16B 37/12; F16B 39/20; F16B 2/24

(Continued)

(56) References Cited

U.S. PATENT DOCUMENTS 1,264,677 A    4/1918  Murrell
2,076,726 A    4/1937  Kamen
(Continued)

FOREIGN PATENT DOCUMENTS

CN    102792033 A    11/2012
DE        493714      3/1930
(Continued)

OTHER PUBLICATIONS

Joining Using Threaded Bushes and Threaded Coils, Metalworking, Oct. 22, 1954, pp. 144-146, vol. 20, No. 9, XP001650513 (English Translation).

(Continued)

*Primary Examiner* — Roberta S Delisle
(74) *Attorney, Agent, or Firm* — Reising Ethington P.C.

(57) ABSTRACT

The present disclosure describes a spring connection element, by means of which at least two components can be connected to each other by means of a claw-fit in at least one component opening. The spring connection element is characterized by the following features: a spiral spring-like wire coil with a first and a second end, said coil comprising a plurality of axially spaced windings, a spiral collar which extends radially beyond a circumference of the wire coil and which is arranged at the first end of the wire coil, and a central traction element protruding radially into the wire coil, which is arranged at the second end of the wire coil, which does not extend axially beyond the wire coil, and by means of which the spring connection element can be pulled into a component opening substantially rotation-free.

4 Claims, 19 Drawing Sheets

Figure 1:
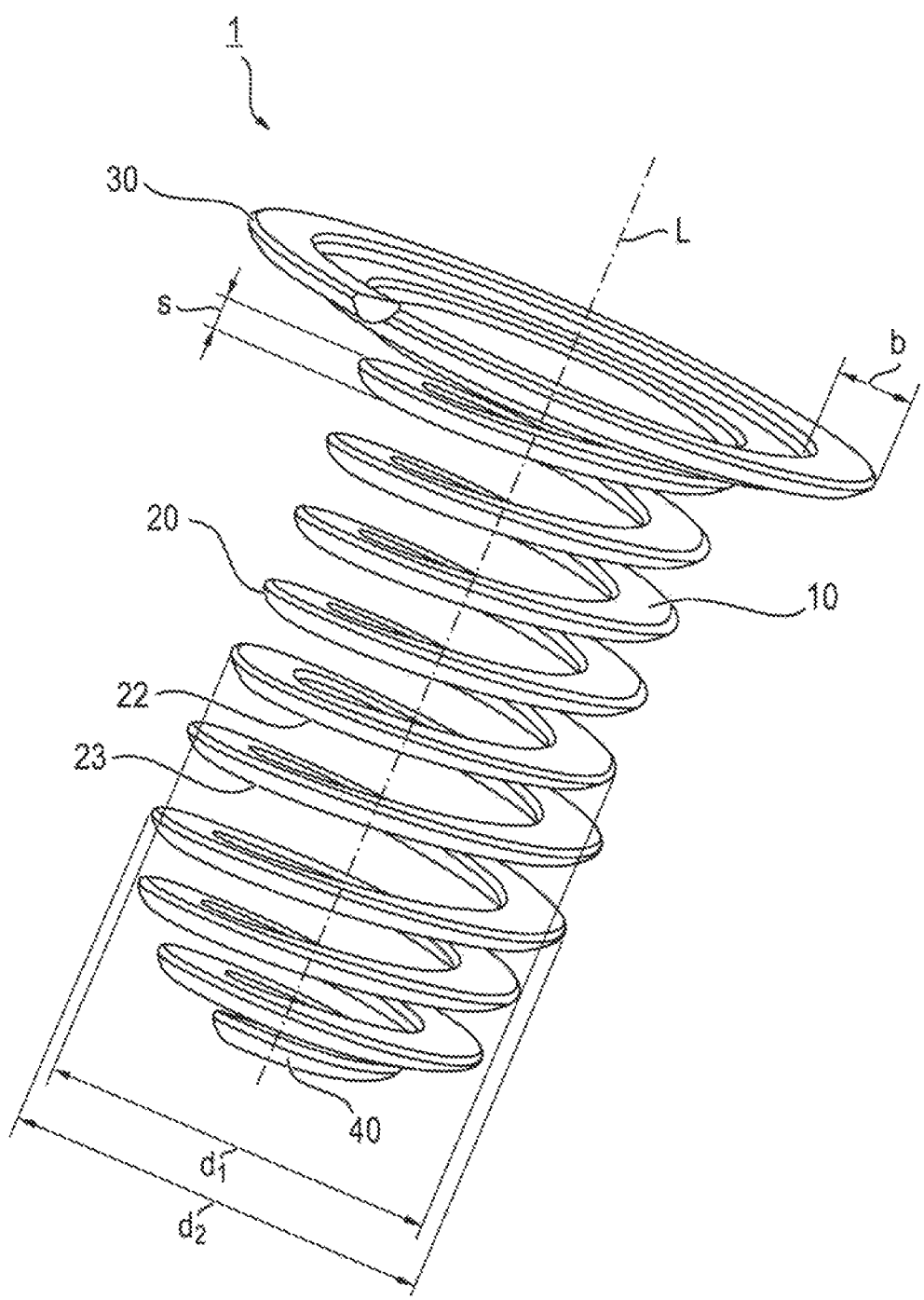

(58) Field of Classification Search
USPC .................................... 411/251, 438, 543
See application file for complete search history.

(56) References Cited

U.S. PATENT DOCUMENTS

| | | | |
|---|---|---|---|
| 2,121,784 A | 6/1938 | Busby | |
| 2,138,919 A | 12/1938 | Herman | |
| 2,201,930 A | 5/1940 | Stark | |
| 2,210,061 A | 8/1940 | Caminez | |
| 2,371,674 A | 3/1945 | Caminez | |
| 2,524,480 A | 10/1950 | Schenk | |
| 2,698,444 A | 1/1955 | Piliero | |
| 2,756,848 A | 7/1956 | Hillegass | |
| 3,062,568 A | 11/1962 | Andresen et al. | |
| 3,165,136 A | 1/1965 | Horton | |
| 3,344,501 A * | 10/1967 | Kulzer | B23P 6/00 29/888.41 |
| 3,348,293 A * | 10/1967 | Newton | B25B 27/143 29/240.5 |
| 3,351,105 A | 11/1967 | DiPerna | |
| 3,440,333 A | 4/1969 | Blomstrand | |
| 3,602,975 A * | 9/1971 | Thurston | B25B 27/143 29/240.5 |
| 4,528,737 A * | 7/1985 | Cosenza | B25B 27/143 29/240.5 |
| 4,553,302 A * | 11/1985 | Cosenza | B25B 27/143 29/240.5 |
| 4,553,303 A * | 11/1985 | Yamamoto | B25B 27/143 29/240.5 |
| 4,563,119 A * | 1/1986 | Cosenza | F16B 37/12 411/438 |
| 4,871,509 A * | 10/1989 | Johansson | G21C 3/18 376/412 |
| 4,917,554 A | 4/1990 | Bronn | |
| 5,163,343 A | 11/1992 | Gish | |
| 6,146,073 A | 11/2000 | Kobusch | |
| 6,171,040 B1 | 1/2001 | Sato | |
| 6,386,076 B1 * | 5/2002 | Swanstrom, Jr. | B25B 7/04 29/527.1 |
| 8,757,859 B2 * | 6/2014 | Zhang | F21S 4/28 362/612 |
| 2002/0166420 A1 | 11/2002 | Giannakakos et al. | |
| 2005/0274768 A1 | 12/2005 | Cummins et al. | |
| 2007/0292238 A1 | 12/2007 | Bowen et al. | |
| 2008/0008557 A1 | 1/2008 | Bucciero et al. | |
| 2012/0225408 A1 | 9/2012 | Moore | |

FOREIGN PATENT DOCUMENTS

| | | |
|---|---|---|
| DE | 603017 | 9/1934 |
| DE | 7038501 | 5/1971 |
| DE | 3147430 A1 | 6/1983 |
| EP | 0992694 A1 | 4/2000 |
| JP | H0674226 | 3/1994 |
| KR | 20000023269 A | 4/2000 |
| WO | WO8603810 A1 | 7/1986 |
| WO | WO9813609 A1 | 4/1998 |
| WO | WO2005115251 A1 | 12/2005 |
| WO | WO2007134588 A1 | 11/2007 |
| WO | WO2011053170 A1 | 5/2011 |
| WO | WO2012084385 A1 | 6/2012 |

OTHER PUBLICATIONS

Written Opinion & International Search Report for PCT/EP2014/069636 dated Jan. 13, 2015, 13 pages.
English translation of the International Preliminary Report on Patentability for PCT/EP2014/069636 dated Mar. 31, 2016, 14 pages.
CN Office Action for CN Application No. 201480051992.9 dated Nov. 1, 2016, 6 pages.
KR Office Action for KR Application No. 10-2016-7009830 dated Apr. 30, 2018 (8 pages).

* cited by examiner

FIG. 5 a1)
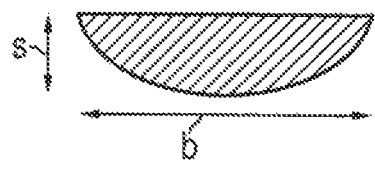
FIG. 5 a2)
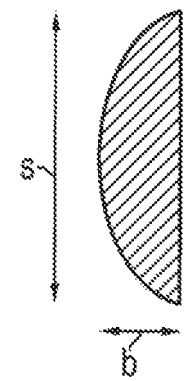
FIG. 5 b1)
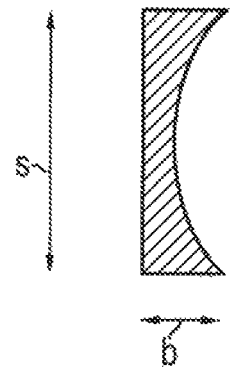
FIG. 5 b2)
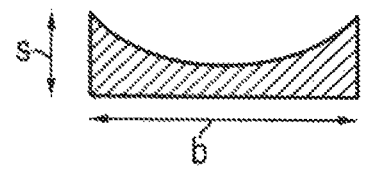
FIG. 5 c1)
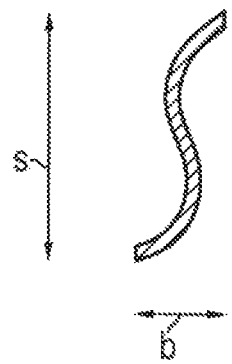
FIG. 5 c2)
FIG. 5 d1)
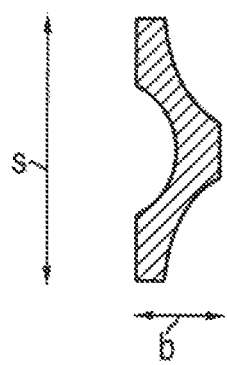
FIG. 5 d2)
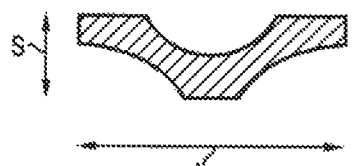

SPRING CONNECTION ELEMENT

1. CROSS REFERENCE TO RELATED APPLICATIONS

This application is a divisional of U.S. patent application Ser. No. 15/022,763 filed Mar. 17, 2016 which is a national phase of PCT/EP2014/069636 filed Sep. 15, 2014 and claims the priority of German patent application DE 102013219013.1, filed on Sep. 20, 2013. The entire contents of these priority applications are incorporated herein by reference.

2. TECHNICAL FIELD

The present disclosure is related to a spring connection element by means of which at least two components are connectable to each other by means of a claw-fit or clamp-fit in a component opening. Furthermore, the present disclosure relates to an installation method and a deinstallation method for such a spring connection element. In addition, the present disclosure describes an installation tool for the above mentioned spring connection element.

3. BACKGROUND

In the prior art, various connection elements are known which connect at least two pre-punched components with each other. A proven approach is to insert a threaded bolt through the component openings and to fasten the components to each other by screwing a nut onto the threaded bolt. But this requires an accessibility of the connection from both sides, which is not always given.

Therefore, WO 2007/134588 A1 proposes a spring screw, which consists of a regularly wounded wire coil with closely spaced or abutting adjacent wire windings. Only by means of this winding arrangement, which is also based on a rigid and non-flexible spring wire, it is possible to produce a thread-like outer contour of the spring screw. At one end of the wire coil, the wire is wound into a flat spiral so that a head-like construction results. The other end of the wire coil has an installation web protruding radially into the coil and by means of which the spring screw is screwed into a component opening. This spring screw is intended for swinging, creeping, setting or generally deformable materials. While screwing the spring screw into the component opening, a thread groove is cut into the radially inner wall of the component opening. Therefore, this spring screw works on the principle of a self-cutting screw, only that it is produced with lower geometric requirements particularly with regard to the formation of a thread. Due to this screw function, the installation effort for this spring screw is great on the one hand, because it is time-consuming to screw it into the component opening. Furthermore, the material of the spring screw has to be adjusted to the component material so that in fact the spring screw can cut a thread groove into the component material. Otherwise this spring screw does not provide any grip in the component opening. It is disadvantageous that the spring screw must be produced with high accuracy so that the spring screw can be kept in the regularly cut thread groove.

WO 2012/084385 A1 describes a cutting spring attachment which is mounted onto a screw. Here, it is already a disadvantage that the connection element is constructed in two parts, since it consists of a screw and a cutting spring attachment. Furthermore, also the installation effort is time-consuming, because the screw has to be screwed into the component opening with care and by cutting a thread.

WO 2011/053170 describes a plurality of connection elements which either are wound from a wire to a wire coil or which comprise at least one wire coil portion between a massive head and a massive end or tip portion of the connection element. The connection elements described herein have a flat radially outer side or a radially outer side consisting of rounded subsections. This configuration of the radially outer side supports a press fit of the connection elements in a component opening, wherein the connection element pushes the radially outer side against the component wall of the bore due to the outwardly directed radial spring forces. This inner radially directed spring forces as well as a torsional stiffness and an axial stability of the disclosed connection elements are achieved especially by means of a tight winding of the wire coil. At this, essentially the adjacent windings abut each other. The connection elements described herein are compressible in radial direction, but not deformable in the axial direction. Once the connection element has been forced into a component opening by means of a radial compression, the inherent tendency of the connection element to expand creates the connection between the component and the connection element. Accordingly, the installation requires a high force effort for inserting the connection element into a component opening. Furthermore, especially the high connection forces applied by the connection element, for example in the radial direction, cause that creeping, setting and flowable materials are modified under these mechanical stresses or loads to the disfavor of the connection. The materials yield namely so that the connection strength between this spring strong connection element and the component is weakened. A further disadvantage is that the described connection element has to be adapted in its radial and axial size to the component opening, like a screw. Because due to the rigid and inflexible wire coil in at least the central region of the connection element no adaption to changed component geometries can be achieved by changing the geometry of the connection element.

A fastening clamp is described in DE 31 47 430 A1. This clamp is made of a wire that is wound into a spiral spring-like wire coil with a head-shaped spiral collar. In adaptation to a component opening into which the fastening clamp is to be used for connecting at least two components, the wire coil is made smaller in its outer diameter than the inner diameter of the bore. It follows that this fastening clamp does not fasten two parts at each other by a radially acting press fit. Rather, this fastening clamp has a hook at its axial end opposite to the spiral collar so that the fastening clamp fastens at least two components between the hook and the spiral collar at each other by tension. Specifically, the fastening clamp can only be installed in through holes. There, the hook is moved away from the wire coil in axial direction so far that it can hook at the opposite component wall at the output of the component bore outside of the bore.

Thus, this fastening clamp is disadvantageously only applicable in through holes. In addition, the hook extends in radial direction beyond the wire coil, which makes an adaption of the space necessary which is required for installation. A further disadvantage is that this fastening clamp cannot prevent radial movement of the components with respect to the wire coil.

Starting from the connection elements described above there is, thus, a need to provide a flexibly usable connection element of simplified manufacturing and installation compared to the prior art.

4. SUMMARY

The above object may be achieved by at least some embodiments of a spring connection element according to independent patent claim 1, an installation method for this spring connection element according to independent patent claim 17, a deinstallation method for a spring connection element installed in a component opening according to independent patent claim 19, an installation tool for this spring connection element according to independent patent claim 20 and by a component with an installed spring connection element according to independent patent claim 23. Advantageous embodiments and further developments of the present disclosure will become apparent from the following description, the drawings and the appending claims.

The spring connection element of the disclosure, by means of which at least two components are connectable to each other by means of a claw-fit or clamp-fit in a component opening, comprises the following features: a spiral spring-like wire coil having a first and a second end, which comprises a plurality of windings, preferably irregularly shaped, which are axially spaced from each other, a spiral collar protruding radially beyond a circumference of the wire coil, which is arranged at the first end of the wire coil, and a central traction element, which is arranged at the second end of the wire coil protruding radially into the wire coil, which does not protrude axially beyond the wire coil and by means of which the spring connection element can be pulled into a component opening substantially rotation-free.

While the spiral collar of the spring connection element is supported at the component wall after insertion into a component opening, the spring connection element is adaptable in its shape by means of the traction element in the radial and the axial direction and, thus, adaptable to the connection conditions. Because the adjacent windings of the spiral spring-like wire coil, which are axially spaced from each other and which preferably have at least one irregular winding, and a spring stiffness of the spring connection element permitting an axial deformation permit an adjustment of the spring connection element by means of the central traction element. The spring-like shape of the wire coil is similar to spiral springs as described for example in DE 603 017 or DE 493 714. The windings of these spiral springs are loose, partially irregularly spaced from each other in axial direction, from which a reduced axial stability results.

In addition, advantageously the windings of the spiral spring-like wire coil also ensure that a sufficient radially compression force is established by the wire coil. On this basis, the spring connection element is able to claw or clamp at the adjacent wall of the component opening such that both a non-positive or force-fit as well as a positive or form-fit connection is created between the spring connection element and the at least one component. In this context it should be emphasized that by means of the traction element, the inventive spring connection element is installable substantially rotation-free. Substantially rotation-free means in this context according to a first embodiment that the spring connection element is inserted in axial direction in at least one component opening without rotation about its longitudinal axis. According to a second embodiment, substantially rotation-free means that the spring connection element is pivoted in an angular range of a maximum of <360°, preferably <270°, in particular <180°, about its longitudinal axis during the installation. However, with this pivoting but not rotating, the reliable anchoring of the spring connection element in the component wall is supported.

For supporting the above described functionality of the spring connection element, different designs or configurations of the spring connection element are advantageous. According to a further embodiment, the wire of the wire coil of the spiral spring connection element has a radial width b and an axial thickness s in its cross section and with respect to the wire coil. The radial width b and the axial thickness s of the wire have a size ratio of $1.25 \leq b/s \leq 3.5$, preferably $2 \leq b/s \leq 3$. From this size ratio of the radial width b and the axial thickness s of the cross section of the wire of the spring connection element results that the wire is formed flattened in the axial direction of the wire coil. Thus, the narrow side of the wire abuts the component wall so that the radial forces of the spring connection element act with a smaller surface element on the component wall than in the axial direction of the wire coil and thus favor the claw-fit in the component wall.

According to a further embodiment, the wire of the wire coil has in its cross-section and with respect to the wire coil at least at the radially outer side of the wire coil a radius of curvature r, which is smaller than the axial thickness s of the wire, preferably $0.05 \, s \leq r \leq 0.5 \, s$. By means of the preferred radius of curvature of the wire cross-section at the radially outer side of the wire coil, the wire is tapered in its cross-section radially outwardly in the same way as a tip or cutting-edge. This geometry facilitates also that the spring connection element claws at the component wall due to the radially outwardly directed locking forces and, thus, secures the spring connection element in the component opening. The form-fit connection created thereby prevents the extraction of the spring connection element from the component opening. While the spring connection element maintains a clawed position in the component opening, it is able for example due to material extensions or creep-processes, to follow these changes in the dimension of the component. This is mainly realized in that the spring connection element may be extended in the axial direction.

According to a further embodiment of the disclosure, the wire coil has a pitch p per revolution U compared to the axial thickness s of the wire of the wire coil in cross-section and with respect to the wire coil with the value $p \geq 1.25 \, s \, U^{-1}$. In this context, and more preferred, the pitch p is in the range of $1.25 \, s \leq p \leq 3.5 \, s$, more preferably in the range of $1.25 \, s \leq p \leq 2.7 \, s$ and still more preferably in the range of $2.0 \, s \leq p \leq 2.7 \, s$. As can be seen from the given pitch values, the wire coil of the inventive spring connection element is preferably wound loosely. By means of this loose winding in the preferred pitch ranges it is ensured that the spring connection element possesses only a limited axial stiffness. In other words, from this special pitch an axial flexibility of the spring connection element results so that it is adaptable flexibly to different component geometries and in particular depths of component openings and connection exceptions or anomalies. Thus, preferably the spring connection element can be extended in axial direction so far, until a preferred depth range in a component opening is reached in which the spring connection element shall radially claw or clamp in the component wall.

For further assisting the firm seat of the spring connection element in the component opening, the wire of the wire coil with the axial thickness s and the radial width b in cross-section and with respect to the wire coil has the following profile: in the width direction oval-shaped or lens-shaped and/or in the width direction oval-shaped or lenticular and in the thickness direction flattened on one or both sides and/or in the thickness direction elongated with a radially outward concave indentation and/or in the thickness direction S-shaped and/or in the thickness direction elongated with a radially outward bulge in the width direction and a radially inward indentation. The above described cross-sectional configurations of the wire of the wire coil support a radial anchoring or clawing of the spring connection element in the wall of the component. Furthermore, the axial and radial stiffness of the wire coil are also adjustable by means of this cross-sectional geometries. In this way, the rigidity of the wire coil is thus determined not only by the material of the spring connection element but also by a suitable profiling of the wire of the wire coil or selected portions or subareas of the wire of the wire coil.

According to another embodiment, the wire of the wire coil has in cross-section and with respect to the wire coil at a radially outer side of the wire coil a clawing contour with a cutting direction, which is arranged with respect to a longitudinal axis of the spring connection element in an angle of $\gamma>90°$. As has been explained above already, the wire is in its cross-section radially outwardly tapered with respect to the wire coil. If the axially upper side and the axial underside of the wire cross-section are converged by means of a line, then these two lines intersect at the radially outer side of the wire cross section and symbolize in this way a cutting edge-like geometry. This cutting edge-like geometry is preferably formed such that it establishes a blocking effect against an extraction direction. This is achieved in that the above-mentioned cutting-edge direction encloses an angle of greater than 90° starting from the longitudinal axis of the wire coil. The cutting-edge direction is defined by the angle bisector of the angle that is enclosed by the axial upper side and the axial lower side of the cutting edge-like geometry at the radial outer side of the cross section.

It may also preferable that the spiral spring-like wire coil includes irregularly shaped windings, which are especially irregularly shaped in the radial and/or axial direction with respect to the wire coil. In specific embodiments of this embodiment, the wire coil of the spring connection element has a cylindrical shape, in which at least one of the windings of the wire coil extends beyond an outer diameter of the cylindrical wire coil. According to a further embodiment, the at least one, preferably two to four, windings are arranged in an axial center portion of the wire coil. Furthermore, preferably the wire coil consists of 3 to 15, preferably 5 to 10, windings for forming the spring connection element.

According to another further embodiment, the windings of the wire coil of the spring connection element comprise radially outwardly an angular or edged shape so that the windings can claw at the opening wall of the component. Exactly this geometric configuration of the wire coil guarantees the already above explained claw-fit of the spring connection element in the component opening. To further support this, it is also preferred that the windings of the wire coil are formed rounded in a radial cross-section and/or S-shaped or at least radially outwardly sharp-edged.

To provide additional axial stability and flexibility to the spring connection element, the spiral collar is, according to another further embodiment, formed conically tapered toward the wire coil. This supports the supporting of the spring connection element by means of the spiral collar on the component surface.

In addition, the central traction element of the spring connection element preferably has a support surface for an installation tool, which is accessible via an interior of the wire coil. This support surface is accessible by means of a below described installation tool. In the same way, it is also conceivable that the central traction element has an installation web protruding axially beyond the spiral collar, which extends within the wire coil. By means of the installation tool or the installation web, the traction element can be deflected in the axial direction so that the spring connection element is drawn into the component opening. In this way, a simple installation of the spring connection element results which requires no additional tools, especially when using the installation web. If the installation web should be in the way after installation of the spring connection element, the installation web is removable from the spring connection element according to a further embodiment by means of a predetermined breaking point in the interior of the wire coil.

To facilitate installation of the spring connection element, the wire coil comprises in the area of the second end in the axial direction a tapering. This tapering is adapted to the component opening so that an easier insertion of the spring connection element is realizable here.

The present disclosure also comprises a component compound made of at least two components each having a component opening, in which a spring connection element in accordance with one of the above described embodiments is installed.

The present disclosure further discloses a method for installing a spring connection element comprising a spiral spring-like wire coil having a first and a second end, a spiral collar radially extending beyond a circumference of the wire coil, which is arranged at the first end of the wire coil, and a central traction element which is arranged at the second end of the wire coil protruding radially into the wire coil, in particular the spring connection element according to one of the embodiments described above. This installation method includes the following steps: arranging at least a first and a second component with mutually aligned component openings and positioning the spring connection element at an entrance of the component opening of the first component, applying a compressive force onto the central traction element which is directed axially with respect to the spring connection element, so that the traction element pulls the wire coil substantially rotation-free into the component opening, or stretching the spring connection element by applying a pulling force between spiral collar and traction element, such that the spring connection element is axially stretched and radially tapered, and inserting the stretched spring connection element substantially or completely rotation-free into the component opening, and relieving the traction element after the spiral collar abuts the first component, so that at least one of the windings of the wire coil anchors in at least one of the component openings.

In this context, it may be preferred that the compressive force is applied to the traction element by means of the installation mandrel or the installation web provided at the traction element. In the same way, the installation mandrel and the installation web allow a pulling of the spring connection element into the component opening. This pulling into the component opening is preferably supported by the fact that a relative pulling force is created between the spiral collar and the traction element. This is either the case because the spiral collar abuts or is supported on the component surface at the entrance of the opening. In another alternative, the spiral collar is held at the installation mandrel while the installation mandrel further deflects the traction element axially. This axial tensile loading of the spring connection element leads to a radial tapering of the spring connection element, whereby the insertion into the component opening is facilitated. Moreover, the spring connection element is adjusted to a desired length, with which it is to be anchored in the component opening. After relief of the spring connection element in the axial direction, it expands radially and the radially outer side of the wire coil clamps at the component wall.

The present disclosure also includes a deinstallation method for a spring connection element installed in a component opening, comprising a spiral spring-like wire coil having a first and a second end, a spiral collar extending radially beyond a circumference of the wire coil, which is arranged at the first end of the wire coil, and a central traction element which is arranged at the second end of the wire coil protruding radially into the wire coil. This deinstallation method comprises the steps of: gripping the spiral collar of the spring connection element, applying an axial tensile load on the spring connection element, so that the spring connection element is stretched and tapered, and complete removing of the spring connection element from the component opening.

Further, the present disclosure describes an installation tool for the spring connection element comprising a spiral spring-like wire coil having a first and a second end, a spiral collar extending radially beyond a circumference of the wire coil, which is arranged at the first end of the wire coil, and a central traction element, which is arranged at the second end of the wire coil protruding radially into the wire coil. The installation tool includes the following features: an installation mandrel onto which the spring connection element is attachable or on which it can be placed, a tool shank adjacent to the installation mandrel, which has a larger outer diameter than the installation mandrel, so that an overstretching of the spring connection element is prevented, and a tool head by means of which an axial compressive force can be applied on the installation mandrel.

By means of the installation tool, the spring connection element is positionable in a component opening. Once the installation mandrel applies an axial compressive force on the traction element of the spring connection element within the component opening, the traction element creates a pulling force in axial direction which pulls the spring connection element into the component opening. At the same time, this compressive force of the installation mandrel creates a radial tapering of the spring connection element, whereby the installation of the spring connection element is supported. In order that the spring connection element is not overstretched in the axial direction, the installation tool has a shank thickness exceeding the inner diameter of the component opening. It follows that the spring connection element may assume the length of the installation mandrel at most, as subsequently the thickened shaft of the installation tool abuts at the component. After the spring connection element has been inserted sufficiently deep into the component opening, the installation tool and in particular the installation mandrel is removed from the wire coil. In this way, the traction element is released and springs back in axial direction. At the same time, the spring connection element and more particularly the wire coil expands in radial direction so that the individual windings of the wire coil dig into the component wall and claw.

According to a further embodiment of the installation tool, a sliding installation sleeve is arranged on the tool shank, by means of which the spiral collar can be engaged at the back. In this way, and by means of an axial sliding of the installation sleeve, a stretching load can be applied on the spring connection element between the installation sleeve and the installation mandrel. In this context it is further preferred that the installation sleeve consists of at least two parts, so that the installation sleeve can be removed from the spiral collar.

5. DETAILED DESCRIPTION OF THE DRAWINGS

Figure 2:
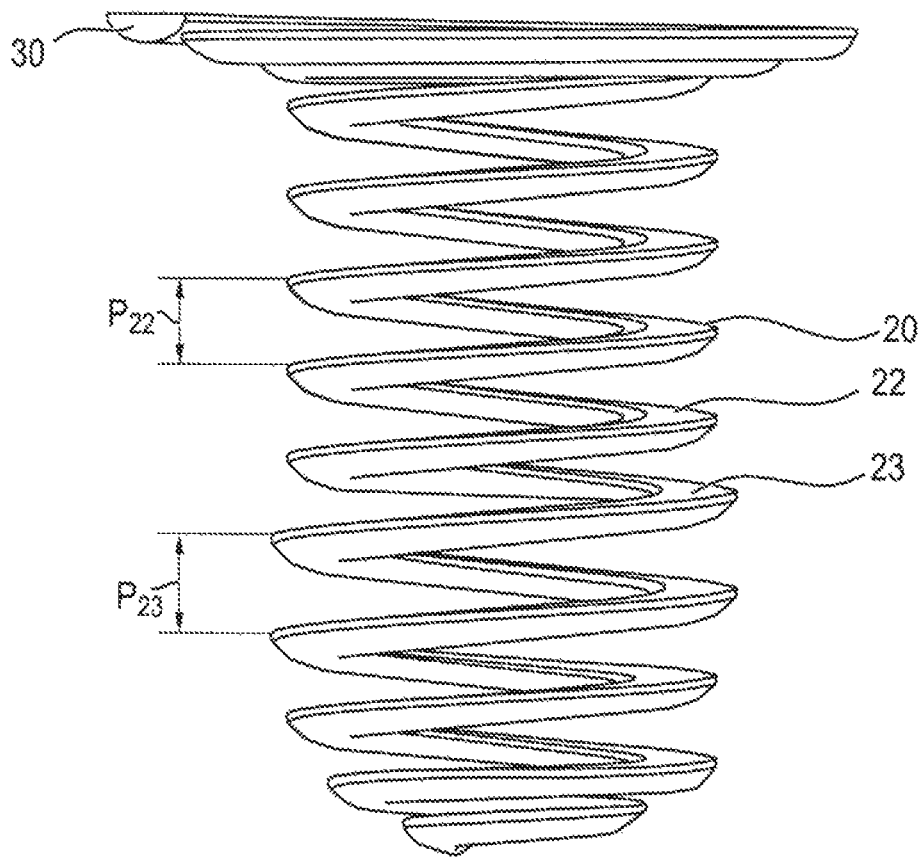
Figure 3:
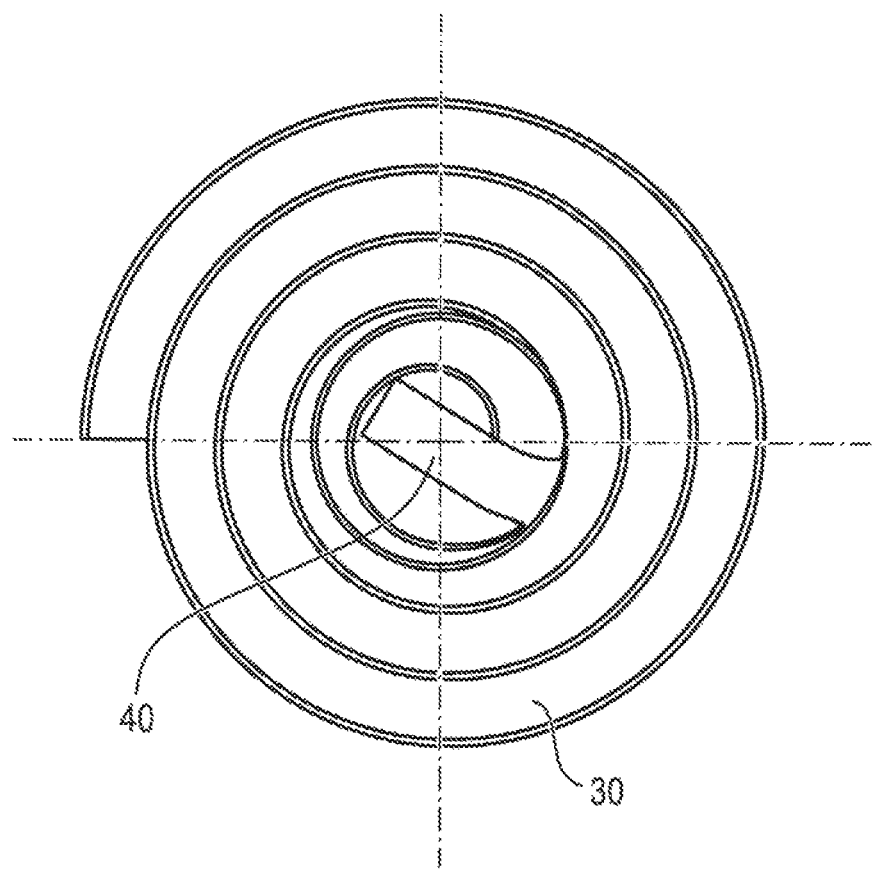
Figure 4:
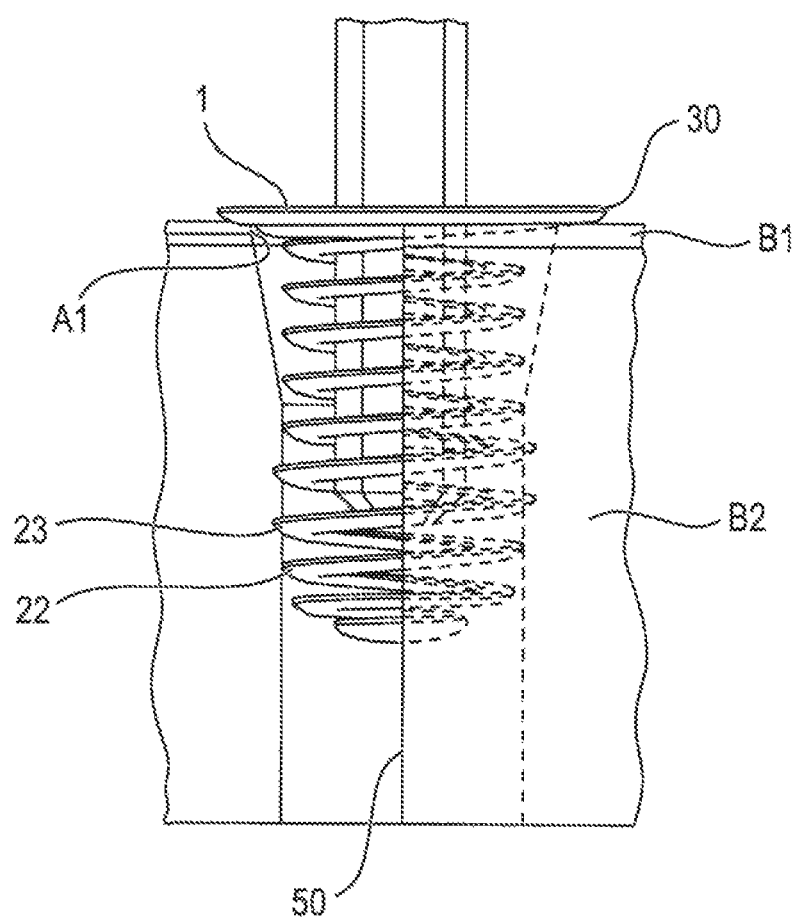
Figure 6:
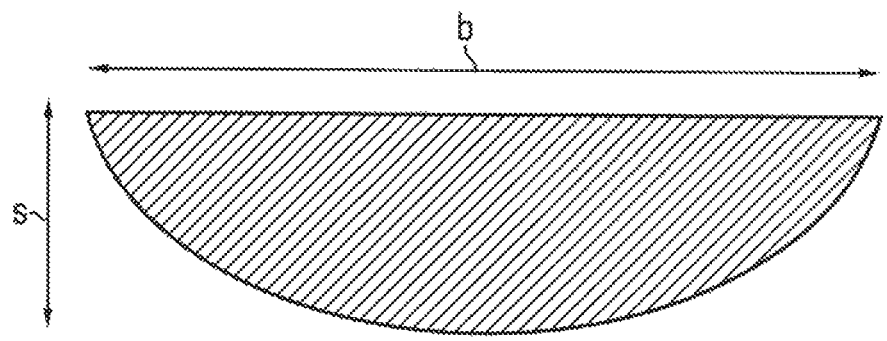
Figure 7:
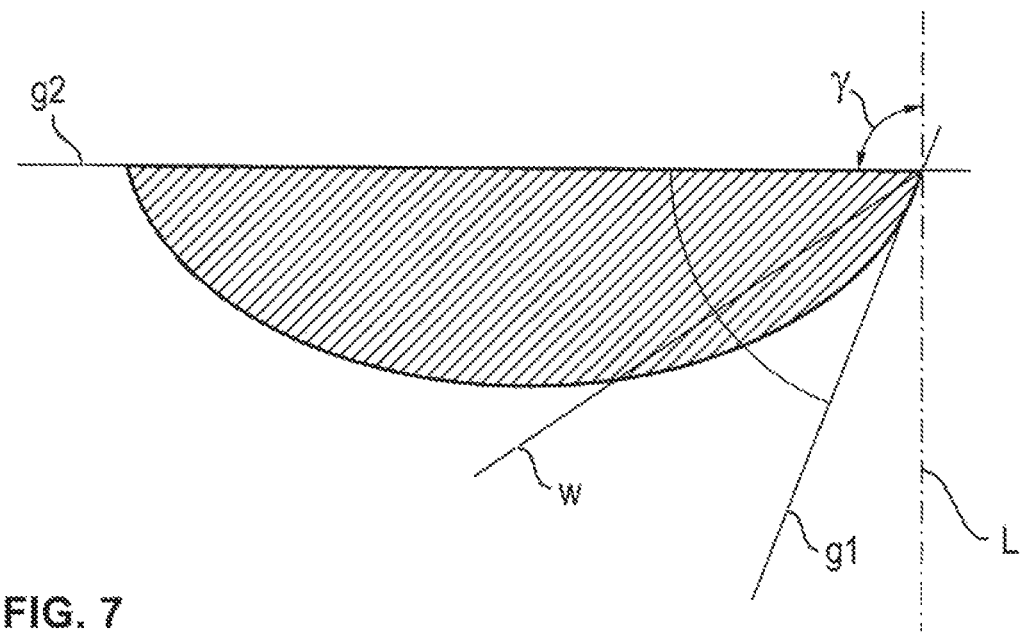
Figure 8:
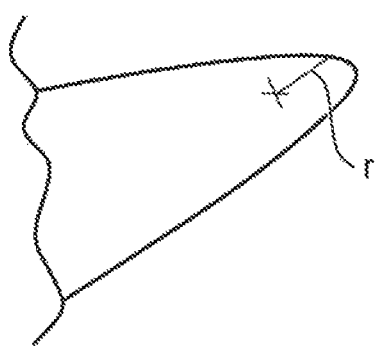
Figure 9:
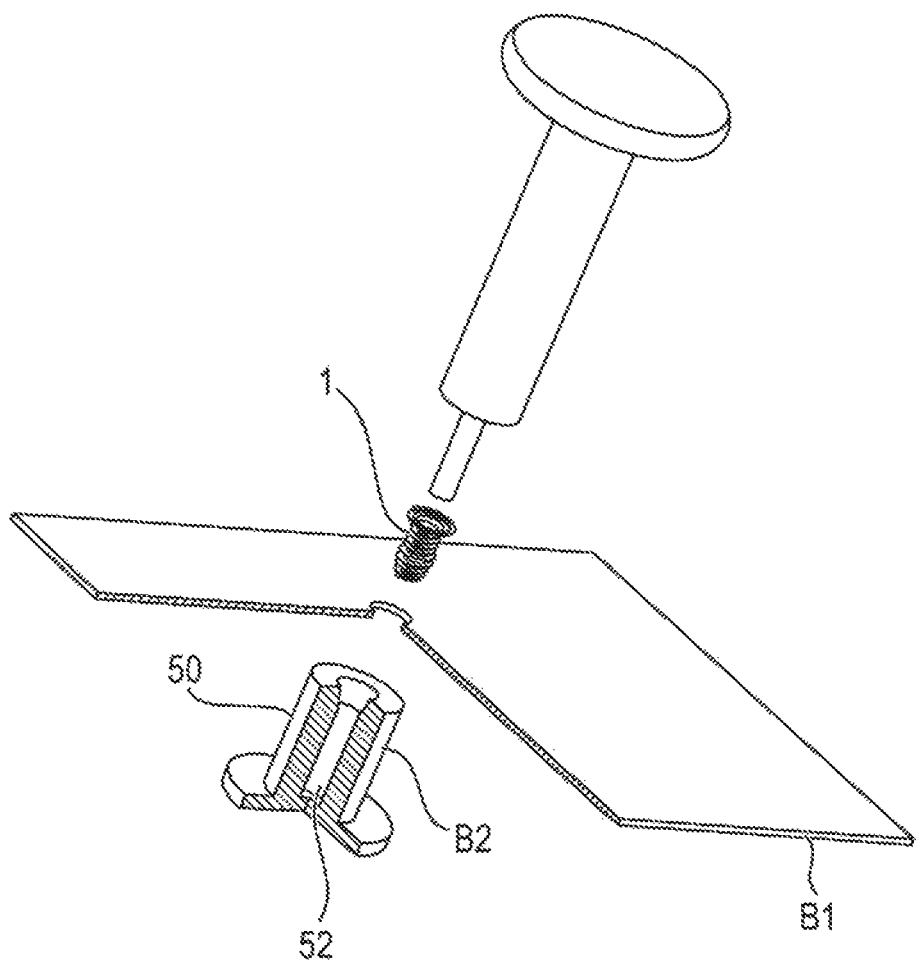
Figure 10:
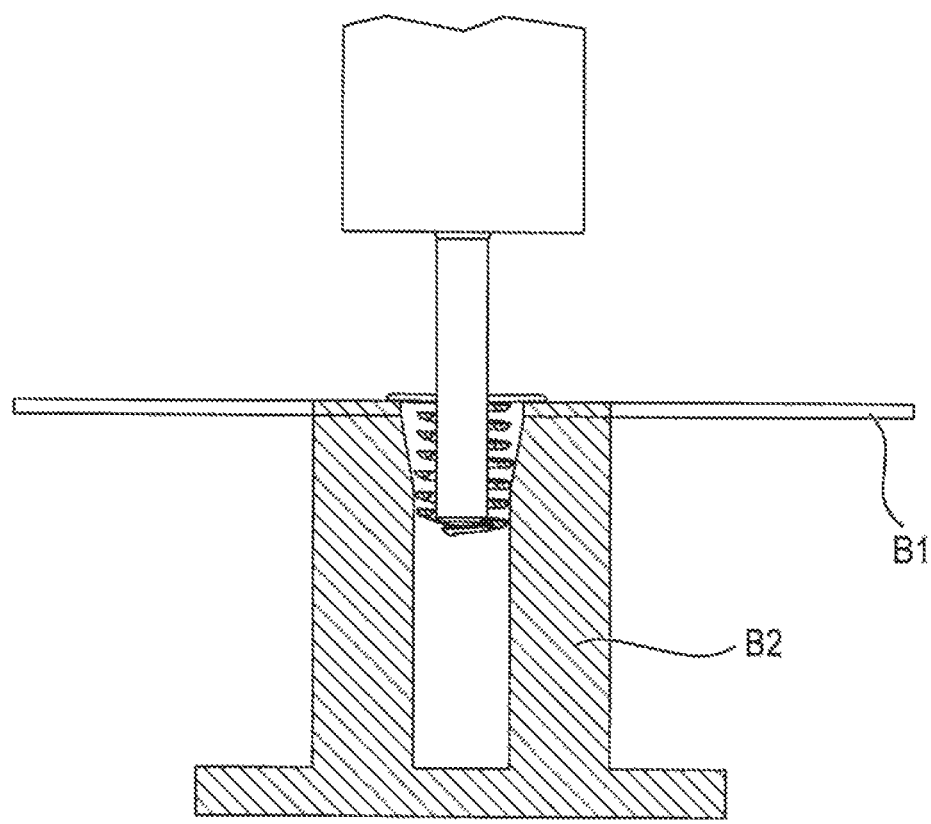
Figure 11:
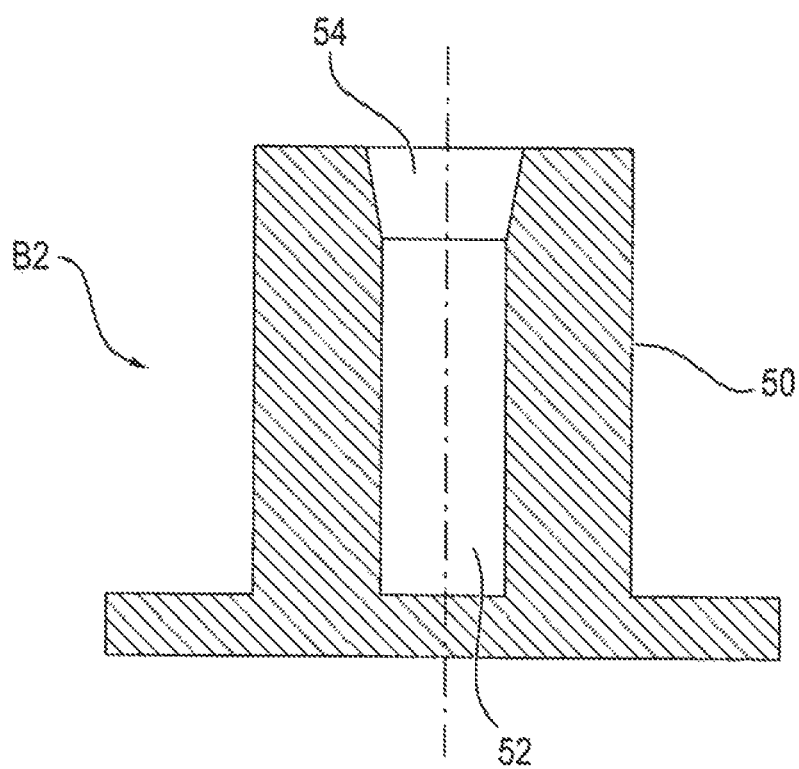
Figure 12A:
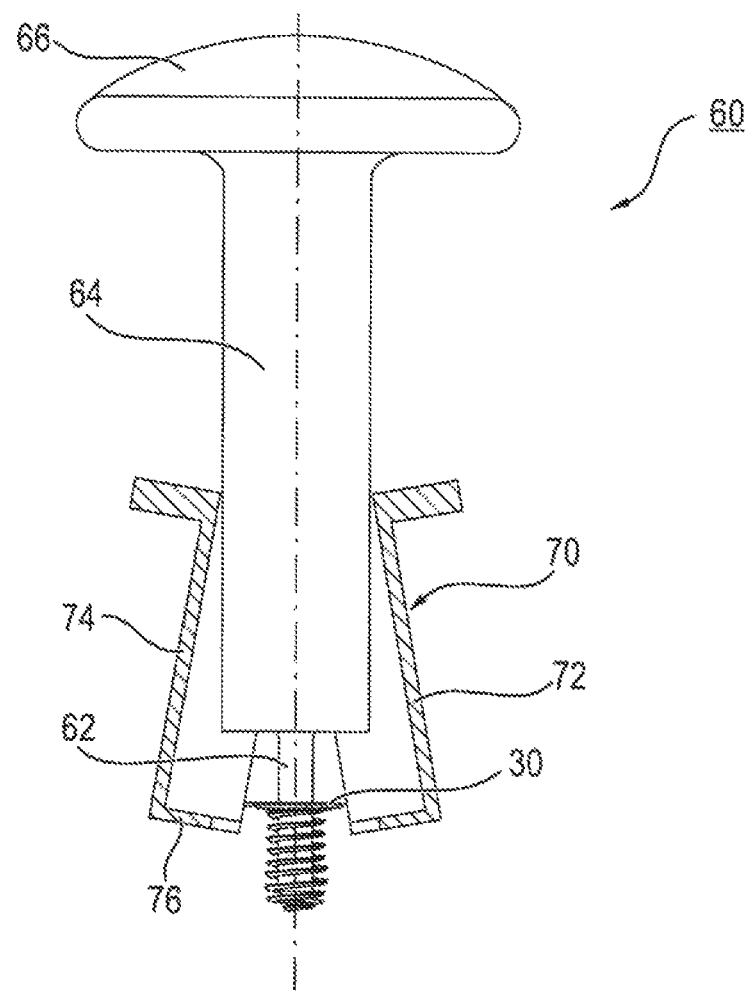
Figure 12B:
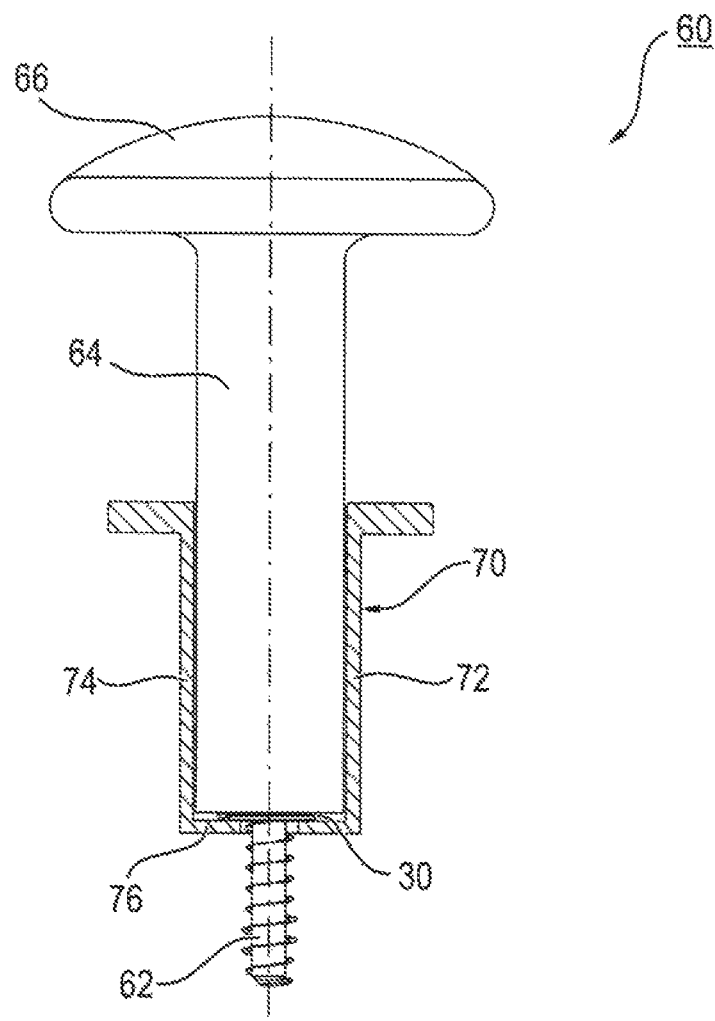
Figure 12C:
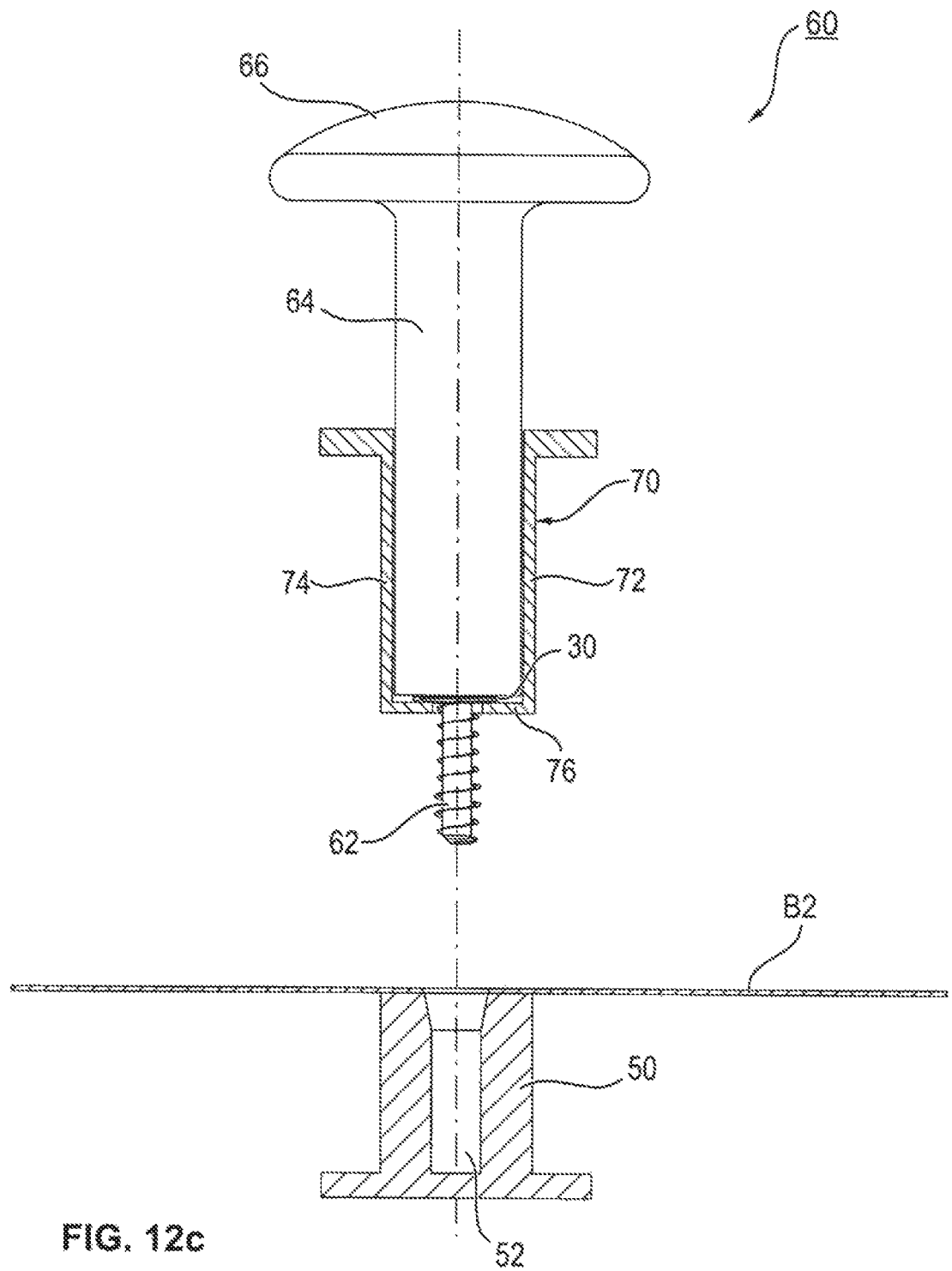
Figure 12D:
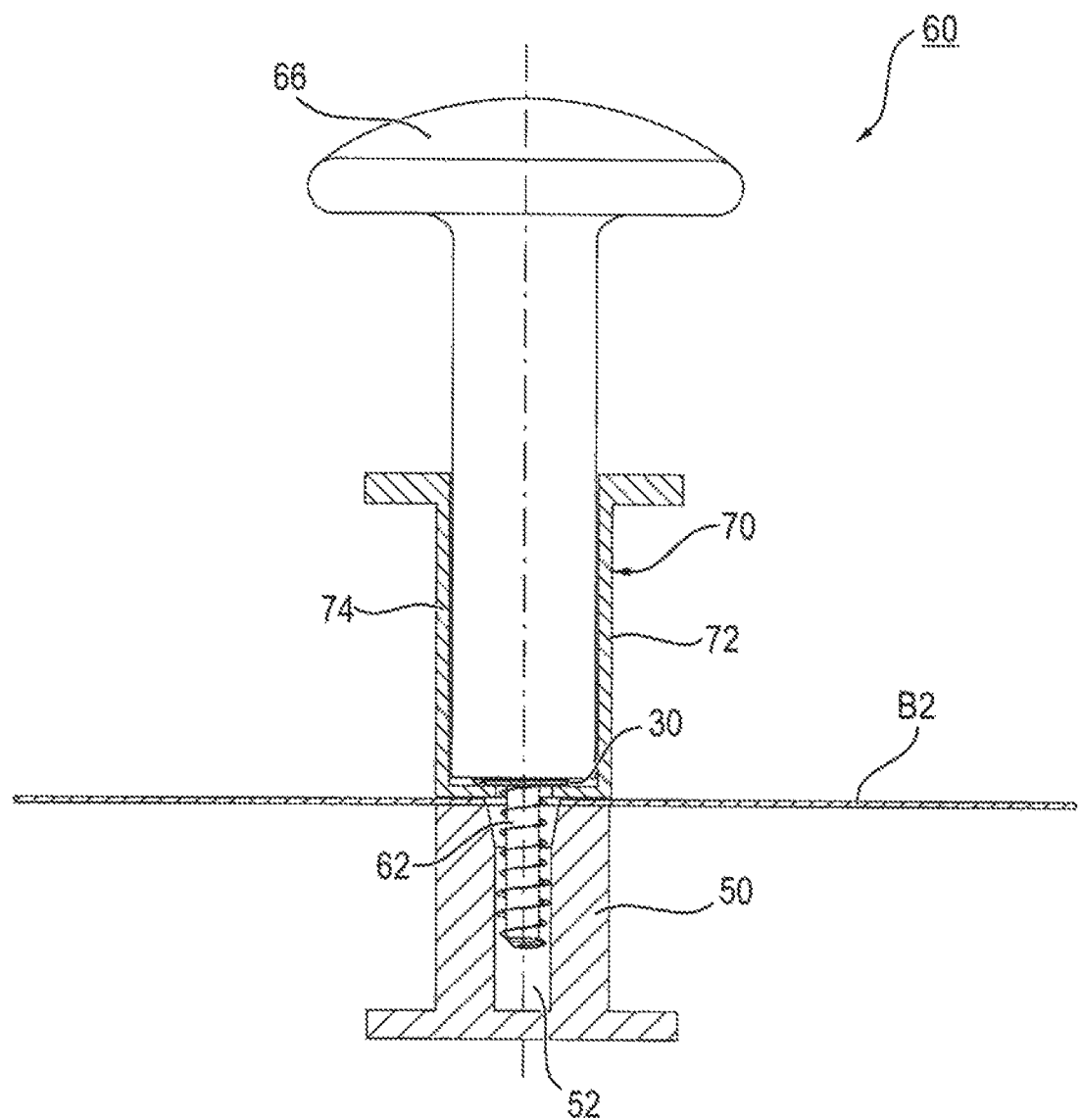
Figure 12E:
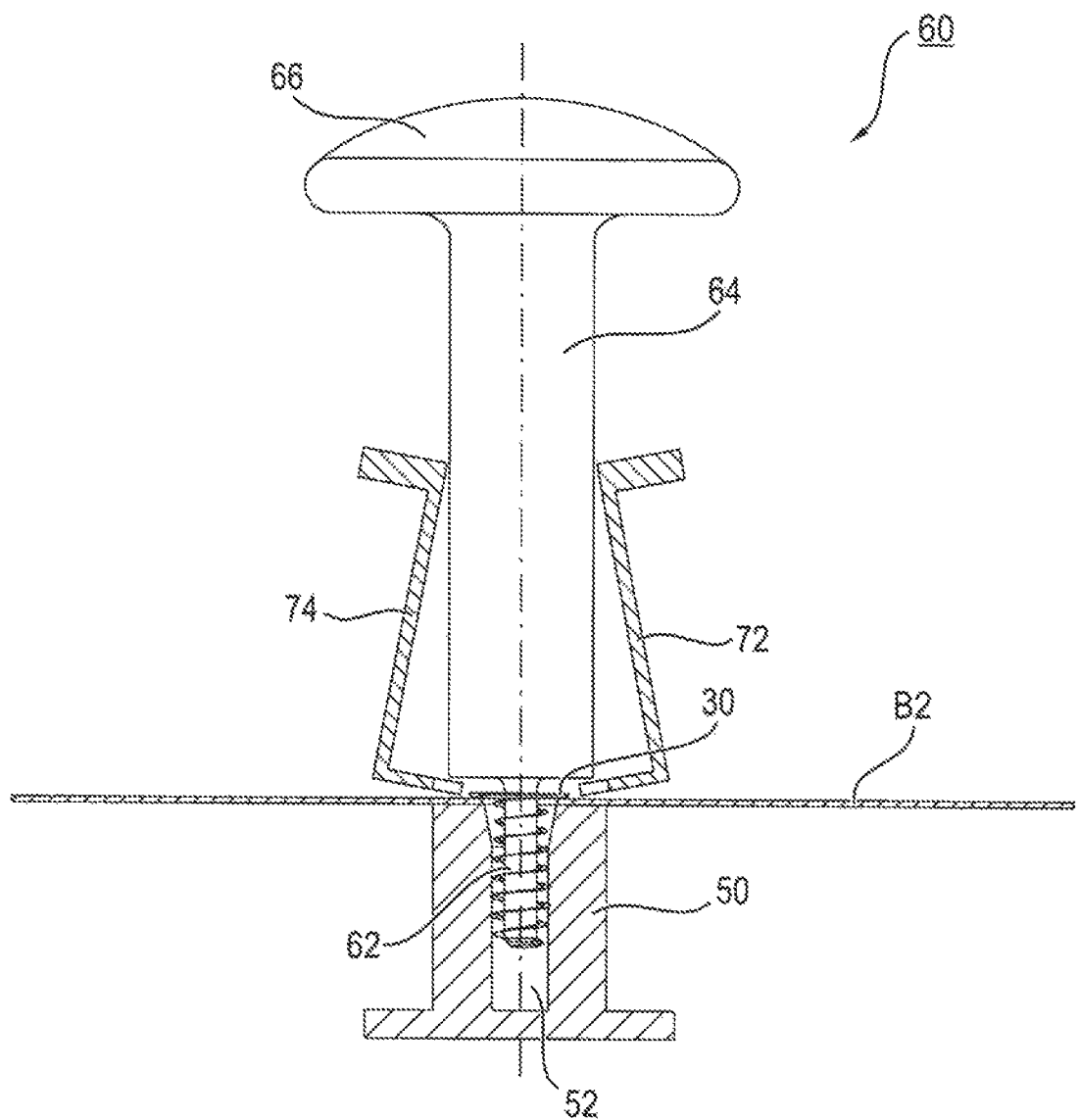
Figure 12F:
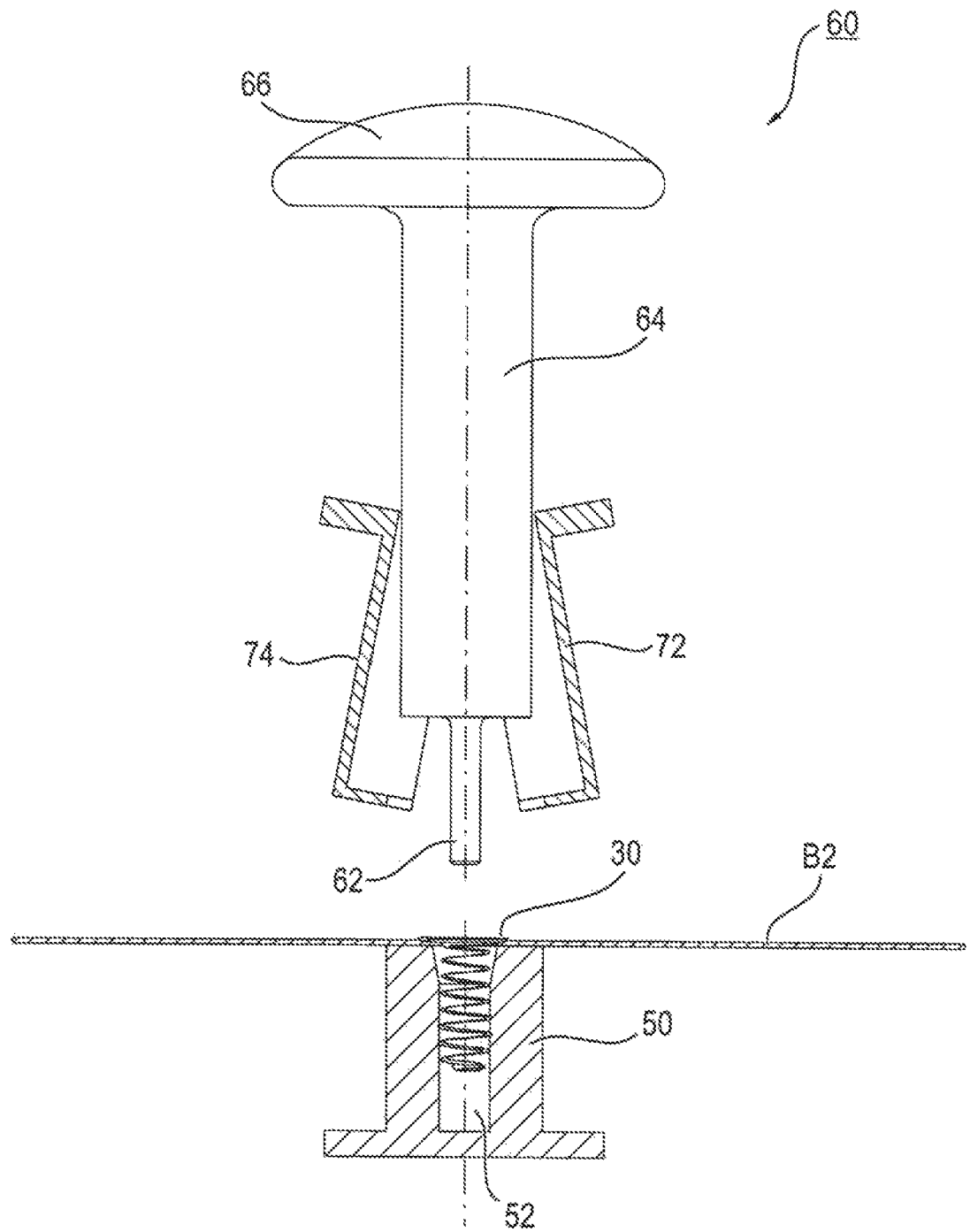
Figure 12G:
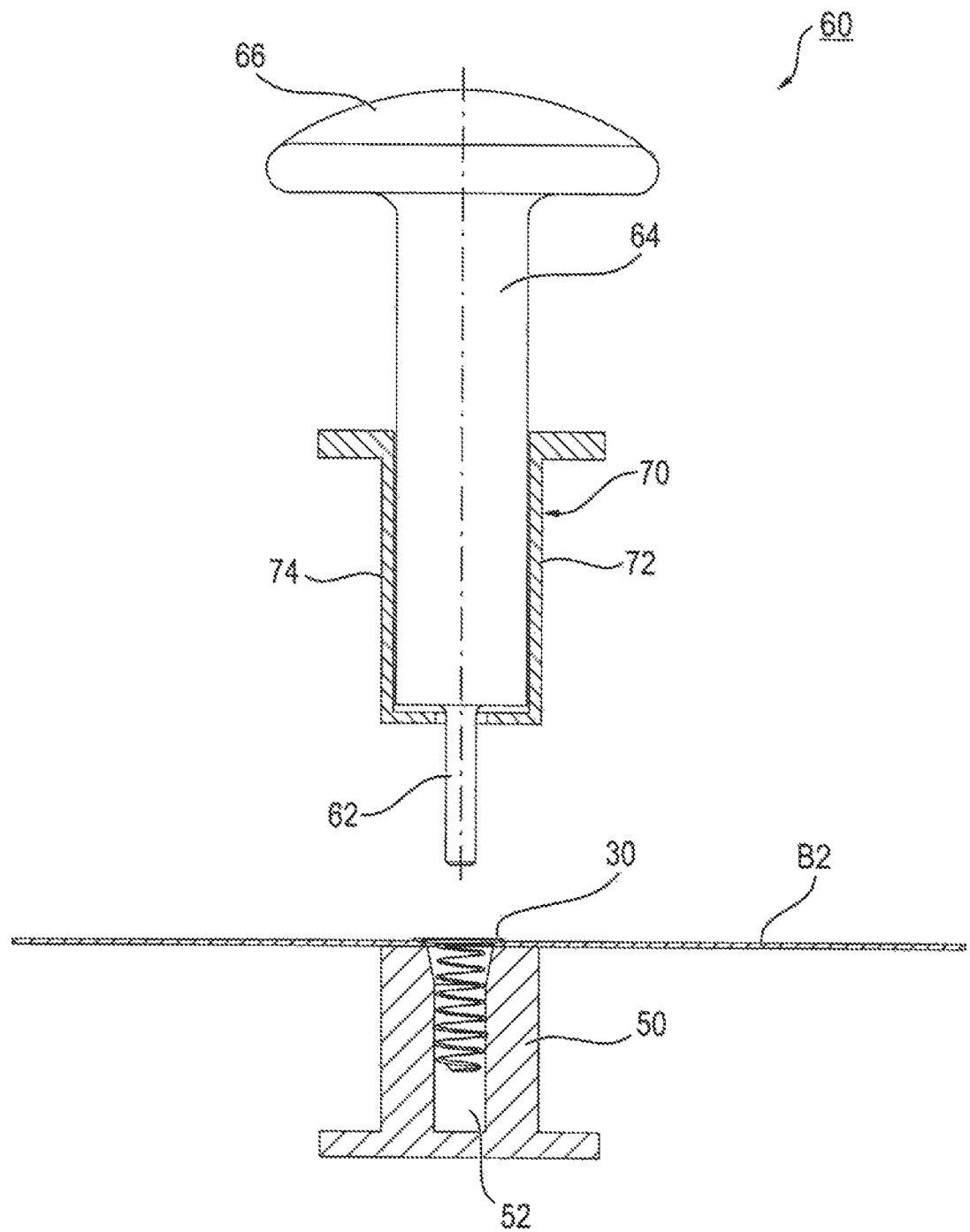
Figure 13:
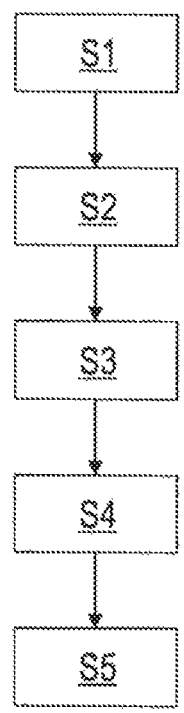
Figure 14:
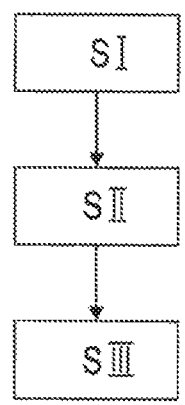

The preferred embodiments of the present disclosure will be explained in more detail with reference to the accompanying drawing. It shows:

FIG. 1 a perspective view of an embodiment of the spring connection element,

FIG. 2 a side view of an embodiment of the spring connection element,

FIG. 3 an axial view of an embodiment of the spring connection element, starting from the spiral collar, FIG. 4 shows an embodiment of a spring connection element installed in two components, FIGS. 5a1, 5a2, 5b1, 5b2, 5c1, 5c2, 5d1 and 5d2 show various cross-sectional shapes of the wire of the spring connection element, FIG. 6 a cross-sectional shape of the wire of the spring connection element, FIG. 7 the cross-sectional shape of FIG. 6 with further explanations, FIG. 8 an enlarged view of a section of a cross-sectional shape of the wire of the spring connection element for illustrating the radius of curvature, FIG. 9 an embodiment of the spring connection element with installation tool before installing the first and second components, FIG. 10 a side sectional view of the installation of the spring connection element with the installation tool in a receiving dome of a component, FIG. 11 an enlarged view of an embodiment of the receiving dome of the second component, FIGS. 12a to g different sequences of the installation method of the spring connection element with an installation tool with preferred installation sleeve, FIG. 13 a flowchart of an embodiment of an installation method, and FIG. 14 a flowchart of an embodiment of a deinstallation method.

6. DETAILED DESCRIPTION

The spring connection element 1 is wound from a wire 10 with a given cross-sectional contour. The spring connection element 1 comprises a spiral spring-like wire coil 20 having a spiral collar 30 at a first end and a central traction element 40 at a second end. The wire coil 20 comprises a plurality of windings 22 which are axially spaced with respect to each other and which are irregularly shaped. The wire coil 20 preferably has a certain outer diameter $d_1$. The fact that the windings 22 are regularly or irregularly shaped causes that different windings 22, 23 have in a preferred embodiment different outer diameters $d_1$ and $d_2$ (see FIG. 1).

The spiral collar 30 consists of the same wire 10 as the remaining of the spring connection element 1. The spiral collar 30 is spirally wound in a radial plane. It follows that the spiral collar 30 has a larger outer diameter than the wire coil 20. In addition, the spiral collar 30 is preferably configured such that it exceeds an inner diameter of a component opening 52. Due to this construction, the spiral collar 30 is supported by the component B1, without being drawn into the component opening 52.

According to a further embodiment, the spiral collar 30 is formed conically tapered in the direction of the wire coil 20. The conical shape of the spiral collar 30 supports a resilient supporting on the top side of the component B1 (see FIG. 4). During the installation of the spring connection element 1 in a bore 52, the spiral collar is compressed in the axial direction. In this way, the spiral collar 30 applies preferably an axial pulling force or tensile force on the wire coil 20 after installation thereof in the bore 52. This pulling force or tensile force causes that a clamping or clawing of the radially outer side of the wire coil 20 in the component wall is supported. Because this pulling force or tensile force, which is directed against the insertion direction of the spring connection element 1, cooperates with the cutting-edge and the cutting-edge direction of the wire cross-section (see below).

As can be seen from FIG. 3, the central traction element 40 is formed in the form of a pin or tang radially protruding into the interior of the wire coil 20. According to a further embodiment, the pin or tang 40 provides a supporting surface for an installation mandrel 62 of an installation tool 60 (see below). According to a further embodiment which is not shown, an installation web extends from the central traction element 40 into the interior of the wire coil 20 in the direction of the spiral collar 30. This installation web preferably protrudes beyond the spiral collar 30 so that it is deflectable in the axial direction, in particular in the direction of the traction element 40, manually or by using a tool. This installation web serves in the same manner as the installation mandrel 62 described below for the installation of the spring connection element 1 in the bore 52 of the component B2. Preferably, the installation web is connected to the central traction element 40 by means of a predetermined breaking point. After the installation of the spring connection element 1 in the bore 52 is completed, preferably the installation web is separated from the central traction element 40 at the breaking point.

The windings 22, 23 of the spiral spring-like wire coil 20 are formed regularly in accordance with a further embodiment so that they have the same outer diameter (not shown). According to a further embodiment, the windings are formed irregularly (see FIG. 1). These windings preferably have a different outer diameter, as has already been mentioned above. In this context, it is preferred that while having a cylindrical shape of the wire coil 20, at least one of the windings 22, 23 of the wire coil 20 extends beyond the outer diameter of the cylindrical wire coil 20. In order to ensure an optimum grip of the spring connection element 1 in the bore 52, the at least one winding 22, 23, which extends beyond the outer diameter of the cylindrical wire coil 20, is arranged in an axial center portion of the wire coil 20. In this context, it is also preferred that the wire coil comprises 3 to 15 windings, preferably 5 to 10 windings. The number of windings 22, 23 can thus be set according to the depth of the bore 52 in the component B1, B2. As especially the windings 23 extending beyond the outer diameter of the cylindrical wire coil support the clamp-fit or claw-fit of the spring connection element 1 in the component B2, it is also preferred to provide a plurality of these windings 23, which extend beyond the outer diameter of the cylindrical wire coil.

According to a further embodiment, the windings 22, 23 of the wire coil 20 have a certain pitch p. The pitch p designates the axial extension of the wire coil 20, after a revolution of 360° about the longitudinal axis L of the wire coil. Preferably, the pitch is $p \geq 1.5$ s per revolution U, wherein s designates the axial thickness of the wire 10 with respect to its cross section. The axial thickness s is illustrated in FIG. 6. For being able to suitably set the axial stiffness of the spring connection element 1, that is, the tensile strength and the torsional rigidity, the pitch p of the wire coil 20 per revolution U compared to the axial thickness s of the wire 10 is preferably set as follows: $1.25 \ s \leq p \leq 3.5 \ s$. In this context, it is further preferred to set the pitch according to $1.25 \ s \leq p \leq 2.7 \ s$ and still more preferably according to $2.0 \ s \leq p \leq 2.7 \ s$.

According to a further embodiment, different sub-areas of the wire coil 20 have different pitches p. For example, the coil 22 has the pitch $p_{22}$, which is smaller than the pitch $p_{23}$ of the winding 23.

FIG. 3 shows a further embodiment of an installed spring connection element 1 in the component opening 52 of the second component B2. The spring connection element 1 connects the first component B1 with the opening A1 to the second component B2. While the spiral collar 30 abuts or rests on the surface of the first component B1, the individual windings 22, 23 clamp at or claw in the wall of the second component B2. The thus created clamp-fit or claw-fit of the spring connection element 1 in the component opening 52 represents a combined form or positive fit and a force or non-positive fit connection between the spring connection element 1 and the components B1 and B2. Because the radial outer side of several windings 22, 23, preferably of each winding, digs into the component wall. This is made possible by the spring connection element 1 inherent spring tensions which are directed radially outward. In addition, the clamp-fit or claw-fit is supported by the variation of the outer diameter of the windings 22, 23 (see above). It is also preferable, to connect more than two components B1, B2 with each other.

An optimum seat of the spring connection element 1 in the component opening 52 is preferably further supported by the fact that the cross section of the wire 10 has a particular profile. Basically, a clawing of individual windings 22, 23 in the component wall is facilitated in that the cross section radially outward with respect to the wire coil 20 has an angular, edged or sharp-edged form. Further advantageous cross-sectional shapes of the wire 10 are shown in FIGS. 5a to 5d. For characterizing the individual cross-sectional contours, the radial width b and the axial thickness s, respectively, are given. FIG. 5a shows an elliptical and on one side in the thickness direction s flattened cross-section. In this case, the longer axis of the ellipse is oriented in the radial direction of the wire coil. Of course, it is also preferred to arrange the longer side of the ellipse in the axial direction and/or to flatten or to dull one or both tip portions of the ellipse. Preferably, this cross section of the wire 10 is inserted such that the flattened side is arranged in the direction of the spiral collar 30. An oval-shaped cross-section with the thicker side radially inwardly and a similarly arranged flattening is also preferred. FIG. 5b1) shows a cross-sectional profile which is formed elongated in the axial direction of the wire coil 20. In addition, this cross-sectional profile comprises a concave outer side so that two acute or sharp-edged radially outwardly facing portions of the profile result. This sharp-edged portions support a clawing of the respectively formed winding in the component wall. Another advantage of the axially elongated cross-sectional contour consists of an additional axial rigidity of the wire coil 20. A wire coil 20 the wire 10 of which has such a cross section, has a larger spring constant than for example a wire coil 20 with a wire cross-section according to FIG. 5a. Another preferred cross-sectional contour of the wire 10 is shown in FIG. 5c1). This wire cross-section extends also in the axial direction so that it has characteristics similar to the cross-section shown in FIG. 5b. Specifically, the cross section is formed in an S-shape. A further embodiment of the wire cross-section is shown in FIG. 5d1). This cross-section is also formed longer in the longitudinal direction of the wire coil 20 than in the radial direction. Thus, a wire coil 20 made of a thus configured wire 10 has a higher spring constant than a wire 10 which is wound with the cross section according to FIG. 5a1). In addition, the cross-sectional contour according to FIG. 5d1) is characterized in that a concave portion is formed at the radial inner side of the wire cross section. At the radially outer side, an angular protrusion is formed, which may also preferably have a radially outwardly directed sharp-edged or acute shape.

The claw-fit and thus the reliability of the spring connection element 1 gets a further preferred support by the cross-sectional shape of the wire 10. Therefore, FIG. 6 and FIG. 5a1) show a cross-sectional shape of the wire 10. The cross section of the wire 10 is characterized by the axial thickness s and the radial width b. Cross-section is in particular a cut through the wire 10 perpendicular to the longitudinal axis of the wire 10. It has proved advantageous if the cross section of the wire 10 is defined by certain ratios of the axial thickness s and the radial width b. Therefore, the cross-section of the wire 10 has in accordance with preferred embodiments the following size ratios: $1.25 \leq b/s \leq 3.5$ and more preferably $2 \leq b/s \leq 3$. From the given size ratios follows that for example an oval-shaped cross-section with a longer side along the radial width of the wire 10 and radially outwardly more tapering as radially inwardly supports the functionality of the spring connection element 1. Therefore, it is preferred to arrange the wire cross-sectional profiles of the FIGS. 5b1), c1), d1) in an angular range of 50° to 130°, preferably 75° to 105°, especially 90° with respect to the longitudinal axis L. For illustrating these arrangements, FIGS. 5b2), c2), d2) show the wire profiles of the FIGS. 5b1), c1), d1) in a preferred angle of 90° with respect to the longitudinal axis L of the spring connection element. This arrangement of the wire profiles has the advantage that after an installation of the spring connection element in the at least two components the radially outwardly arranged edge portions claw or anchor in the component wall. With respect to the embodiment of FIG. 5a), it is also preferred to arrange them in an angular range of 50° to 130°, preferably of 75° to 105°, especially 90° with respect to the longitudinal axis L. FIG. 5a2) in turn shows an arrangement in which the profile of FIG. 5a1) is rotated 90° clockwise. It is understood that the above mentioned preferred b/s ratios refer to the wire profile arrangements according to FIGS. 5a1), b2), c2) and d2) or to profiles formed similar elongated in the radial direction.

Furthermore, it has been found advantageous and preferred that the radially outer side of the cross section of the wire 10 has a certain radius of curvature r with respect to the wire coil 20. This radius of curvature r is illustrated in FIG. 8. According to a further embodiment, the radius of curvature r is smaller than the axial thickness s of the cross section of the wire 10. In this context, it is further preferred that the radius of curvature is in the following range: $0.05 \, s \leq r \leq 0.5 \, s$. Such a configuration of the radius of curvature r supports the form-fit and force-fit seat of the spring connection element 1 in the component wall.

According to a further embodiment, the wire cross-section is radially outwardly tapered such that it resembles a blade or cutting-edge geometry. This cutting-edge geometry, as preferably realized in FIGS. 5a1) and 5b1), 5 c2) and 5 d2) and shown enlarged in FIG. 7, cuts into the component wall of the component B2 due to the radially outwardly directed forces of the spring connection element 1. Thus, the above-described non-positive-fit and positive-fit retention of the spring connection element 1 in the component B1, B2 is supported. In this context, it is preferred that the cutting-edge geometry has a specific cutting-edge direction. The cutting-edge direction is defined by the cross section of the wire 10. If the radially outward directed part of the cross section of the wire 10 is converged by two lines g1 and g2, then the lines g1 and g2 enclose a certain angle. If the cross-section of the wire 10 has a curvilinear shape, then the curvilinear side of the cross section is converged by a tangent on the radially outer point, as shown in FIG. 7 by the line g1. If now the angle bisector w for the angle between the straight lines g1 and g2 is formed, then the angle bisector w illustrates the cutting-edge direction.

The cutting-edge direction W may be advantageous and preferred, when an angle γ starting from the longitudinal axis L of the spring connection element 1 to the angle bisector w is greater than 90°. More preferably, the angle ranges from $95° < \gamma < 120°$. In this cutting-edge direction, the radially outer side of the wire 10 braces against the component wall due to the radially acting spring force of the spring connection element 1. Due to this orientation, the clawing wire winding acts similar to a chip-removing blade against a possible axial extraction force. With this cutting-edge direction, a clawing of the spring connection element 1 in the component wall is thus increased.

As can be seen with reference to FIGS. 4, 9 and 10, the spring connection element 1 is inserted into a bore (see FIG. 4) or into a fastening dome 50 with the bore 52 according to FIGS. 9 and 10. Here, the spring connection element 1 is not pivoted or rotated about its longitudinal axis L or only in an angular range of <360° (see above). To facilitate insertion, the wire coil 20 tapers at its second end, which is remote from the spiral collar 30 (see FIGS. 1 and 2). It is in this context also preferred, to provide a larger opening diameter at the entrance of the bore 52 of the component B2 compared to the remaining of the bore 52. This can be seen in particular in FIG. 11, which shows an enlarged view of the fastening dome 50 with bore 52.

The spring connection element 1 is preferably inserted with an installation tool 60 into the bore 50, as shown in FIG. 12a. The installation tool 60 includes an installation mandrel 62 on which the spring connection element 1 can be plugged. In addition, the installation tool 60 comprises a tool shank 64 which is disposed adjacent to the installation mandrel 62. This tool shank 64 has a larger outer diameter than the installation mandrel 62. Due to this geometric configuration of the installation tool 60, it is ensured that the spring connection element 1 is not over-stretched in the axial direction during the installation. Furthermore, the installation tool 60 includes a tool head 66, by means of which an axial compressive force can be applied on the installation mandrel 62.

According to a further embodiment of the installation tool 60, an installation sleeve 70 is additionally provided on the tool shank 64. This installation sleeve 70 is arranged on the tool shank 64 slidably in the axial direction. It is shaped such that it can engage behind the spiral collar 30 of a spring connection element to be installed. If the installation mandrel 62 is supported at the central traction element 40 and the installation sleeve 70 is moved together with the spiral collar 30, which is engaged from behind, in the direction of the tool head 66, then the spring connection element 1 is thereby stretched in the axial direction. This axial stretching of the spring connection element 1 causes at the same time that the spring connection element 1 tapers in radial direction. In this way, an insertion of the spring connection element into the bore 50 is facilitated. This condition is illustrated in FIG. 12*b*. In the same way, it is of course also preferred to use the installation tool 60 without the installation sleeve 70.

In the following, the installation of the spring connection element 1 will be explained with reference to the FIGS. 12*a* to 12*g* and the flow diagram in FIG. 13. First, in step S1, the spring connection element 1 is plugged onto the installation mandrel 62. In a further optional step S2, the installation sleeve 70 is used to stretch the spring connection element 1 axially and to taper it radially. To this end, the installation sleeve 70 is preferably constructed in several parts in order to engage specifically behind the spiral collar 30 and to release it again. According to a further embodiment, the installation sleeve 70 is longitudinally separated into two sleeve halves 72, 74 (see FIG. 12*a*). According to a further embodiment of the installation sleeve, not shown, a sleeve base 76 adjacent to the spiral collar 30 is provided openable and closable. Thereby, the spiral collar 30 could be specifically caught and released.

After the spring connection element 1 has been arranged stretched on the installation mandrel 62, it is inserted in step S3 in the aligned superimposed bores of the components B1, B2. If no installation sleeve 70 is used, the spring connection element 1 is insertable in the same manner in the bores of the components B1, B2. For achieving an axial stretching of the spring connection element 1 and thus a radial tapering, the installation mandrel 62 inserts the spring connection element 1 so far into the bore 52 until the spiral collar 30 is supported on the component top. If now the installation mandrel 62 is inserted further into the bore 52, an axial stretching and a radial tapering of the spring connection element 1 occurs (see FIGS. 12*c* to 12*d*).

As can be seen from the above description, the spring connection element 1 is installed in the bore 52 substantially rotation-free.

In step S4, the spring connection element 1 is relieved, so that the radially outer side of the wire coil 20 claws into the component wall. According to a further embodiment, the relief of the spring connection element 1 occurs in that the installation sleeve 70 releases the spiral collar 30 (see FIG. 12*e*). Thereby, the spiral collar 30 springs towards the hole 52 as the installation mandrel 62 still axially stretches and holds the spring connection element 1. Thereafter, the installation mandrel 62 is removed from the bore 52, so that the spring connection element moves into the claw-fit. If no installation sleeve 70 is used, the installation mandrel 62 is simply removed from the spring connection element 1.

In this way, the spring connection element 1 is fully installed in the bore 52, whereby the parts B1 and B2 are connected to each other reliably. In an optional step S5, the sleeve halves 72, 74 are closed again, so that the installation sleeve 70 abuts the tool shank 64.

In the same way as the installation mandrel 62 has been used, to apply a compressive force on the traction element 40, the installation web (see above, not shown) is also used therefor according to another preferred embodiment. Once the spring connection element is fully installed in the bore 52, the installation web can be removed from the interior of the wire coil by means of the preferred breaking point.

The present disclosure also includes a deinstallation method for a spring connection element 1 installed in the component opening 52. This deinstallation method is illustrated by the flowchart in FIG. 14. For removing the spring connection element 1 from the bore 52, in a first step S I, the spiral collar 30 of the spring connection element 1 is gripped. Subsequently, an axial tensile load is applied on the spring connection element 1 in step S II. Based on this axial tensile load, the spring connection element 1 is stretched in the axial direction and tapered at the same time. This already leads to a loosening of the claw-fit of the spring connection element 1 in the component wall. Finally, the spring connection element 1 is completely removed from the component opening 52 (step S III). The deinstallation method is performed manually with pliers or automatically by means of a respective removal device.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. A deinstallation method for a spring connection element installed in a component opening, wherein the spring connection element comprises a spiral wire coil having a first and a second end, a spiral collar extending radially beyond a circumference of the wire coil, which is arranged at the first end of the wire coil, and a central traction element radially protruding into the wire coil, which is arranged at the second end of the wire coil, in which a wire of the wire coil comprises in a cross-section and with respect to the wire coil a radial width (b) and an axial thickness (s) with a size ratio of $1.25 \leq b/s \leq 3.5$, wherein the deinstallation method comprises the steps of:
   a. gripping the spiral collar of the spring connection element,
   b. applying an axial tensile load on the spring connection element, so that the spring connection element is stretched and tapered,
   c. loosening a claw-fit of the connection element in the component wall, and
   d. completely removing the spring connection element from the component opening.

2. An installation tool for a spring connection element comprising a spiral wire coil having a first and a second end, a spiral collar extending radially beyond a circumference of the wire coil, which is arranged at the first end of the wire coil, and a central traction element protruding radially into the wire coil, which is arranged at the second end of the wire coil, said installation tool comprising the following features:
   a. an installation mandrel onto which the spring connection element can be plugged,
   b. a tool shank adjacent to the installation mandrel, which has a larger outer diameter than the installation mandrel, so that overstretching of the spring connection element is prevented,
   c. a tool head by which an axial compressive force can be applied to the installation mandrel, wherein
   d. a slidable installation sleeve is arranged on the tool shank, by which the spiral collar can be engaged from behind, so that by an axial displacement of the installation sleeve a stretching load can be applied on the spring connection element between the installation sleeve and the installation mandrel.

3. The installation tool according to claim 2, the installation sleeve of which comprises at least two parts, so that the installation sleeve is removable from the spiral collar.

4. A deinstallation method for a spring connection element installed in a component opening, wherein the spring connection element comprises:
- a spiral wire coil having a first and a second end,
- a spiral collar extending radially beyond a circumference of the wire coil, which is arranged at the first end of the wire coil, and
- a central traction element radially protruding into the wire coil, which is arranged at the second end of the wire coil, wherein the central traction element has an installation web protruding axially beyond the spiral collar, which extends within the wire coil, wherein the deinstallation method comprises the steps of:
a. gripping the spiral collar of the spring connection element,
b. applying an axial tensile load on the spring connection element by the installation web, so that the spring connection element is stretched and tapered, and
c. completely removing the spring connection element from the component opening.

* * * * *